May 29, 1945.	L. J. PAGE	2,376,977

OPHTHALMIC MOUNTING

Filed June 8, 1943

Louis John Page

INVENTOR

Patented May 29, 1945

2,376,977

UNITED STATES PATENT OFFICE 2,376,977

OPHTHALMIC MOUNTING

Louis John Page, Hollis, N. Y., assignor to Olive Page, Hollis, N. Y.

Application June 8, 1943, Serial No. 490,035

4 Claims. (Cl. 88—41)

This invention relates to ophthalmic mountings and more particularly it has reference to the type of mountings having an arcuate arm to support the lens and the temple endpiece.

This application is a continuation in part of my co-pending application Serial No. 354,800, filed August 30, 1940, and entitled, Semirimless spectacles, in which there is claimed an ophthalmic mounting comprising arcuate arms, strap ears and lens notch engaging means.

The feature of mountings comprising arcuate arms to support the lenses and the temples has depended upon various types of lens attachments and temple support arms. Such attachments usually require two lugs to support each lens or a strap having spaced ears and shoes. In this invention a single lug supports each lens, the temporal end of the arcuate arm supporting both the temple and a lens notch engaging means.

The object of my invention is to provide an ophthalmic mounting that is inconspicuous, light in weight, sturdy and practical. Another object is to provide an improved means of securing it to lenses. Another object is to provide a pivoting lens attachment so that lenses can be easily cleaned. Another object is to provide a lens notch engaging means utilizing the spring action of the arcuate arm to releasably secure it in position. A further object is to provide a construction that holds the lenses firmly in correct position and flexible enough to absorb shock, reducing lens breakage. A still further object is to provide a construction that is practical and economical to manufacture. These and other objects reside in novel features of construction, arrangements and combination of parts which will be more fully described and pointed out in the appended claims.

Referring to the drawing.

For the purpose of clarity the surface of the lenses toward the eyes will be termed "the rear surface" and the opposite surface will be termed "the front surface." The side of the lenses adjacent to the nose will be termed "the nasal side" and the opposite side will be termed "the temporal side."

Figure 1:
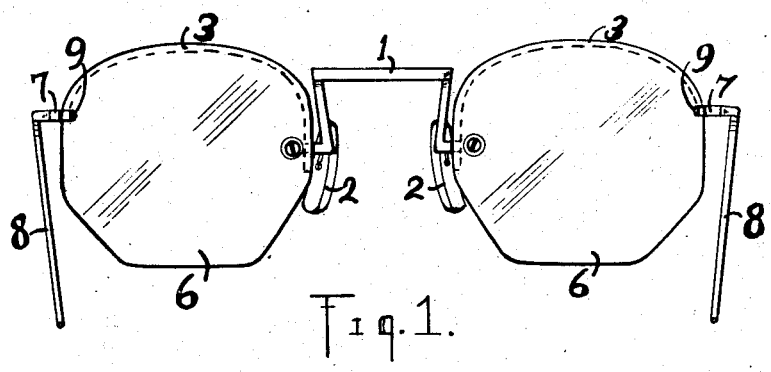
Figure 1 is a front elevation of a pair of spectacles embodying my invention.
Figure 2:
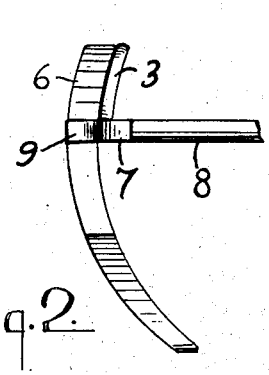
Figure 2 is an enlarged fragmentary elevation of same showing the temporal side.
Figure 4:
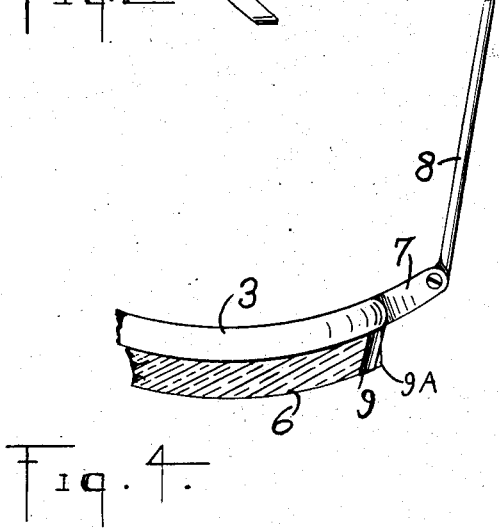
Figure 4 is an enlarged fragmentary plan view of same, showing the lens in section, showing the temporal part.
Figure 5:
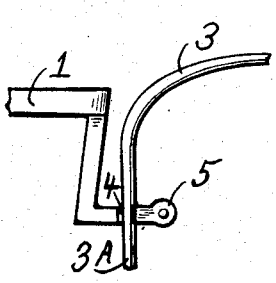
Figure 5 is an enlarged fragmentary front elevation of same with lens removed.

Now referring to the drawing, a pair of spectacle eyeglasses is shown in Figure 1 embodying the features of my invention wherein a bridge 1, preferably of the type having nose pads 2, connects the arcuate arms 3 and I prefer to extend the arcuate arms below the bridge connection providing a free end 3A (Figure 5). A threaded ear 5 is attached radially to the arcuate arm so that the front surfaces of the ear and the arcuate arm are substantially flush. In Figure 5 the preferable arrangement of the bridge 1, nose pad support arm 4, the arcuate arm 3 and the ear 5 is shown. This arrangement of the parts allows the assembly by soldering or welding in one operation. A pair of lenses 6 are provided with a hole at the nasal side and a notch 9A (Figure 3) at the temporal side. I prefer to make the notch 9A deeper at the front surface of the lens than at the rear surface of the lens as shown in Figure 4. Each lens is pivotally attached to the ear by means of a screw fitted with a washer or the like, and I prefer to insert a washer (over the screw) between the rear surface of the lens and the front surface of the ear. The arcuate arms are directed along the rear surface of the lenses so that the top surface of the arcuate arms is in substantial alignment with the top edge of the lenses. The arcuate arms terminate at the temporal side of the lenses. The endpieces 7 are attached to the temporal side of the arcuate arms. A pair of temples 8 are pivotally mounted on the endpieces 7. A lug 9 projects forwardly from the endpiece and the arcuate arm (Figure 2) and I prefer to incline the lug 9 (Fig. 4) inwardly. The arcuate arm 3, the endpiece 7 and the lug 9 can be soldered or welded together. They can be integrally formed in various combinations and I prefer to make the lug 9 and the endpiece 7 integral.

Figure 3:
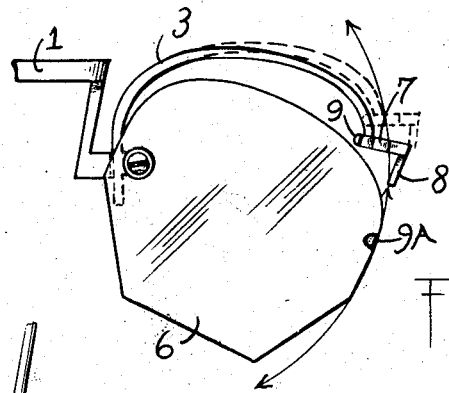
Figure 3 is an enlarged fragmentary front elevation of same, showing the lens in a dropped position and the arcuate arm in released and attached positions.

Now referring to Figure 3, the lens 6 is shown in a rotated dropped position. In this position the lens can be easily cleaned since the rear surface is unobstructed. The arm 3 is made of a spring material and coils when the lug 9 is disengaged from the lens notch 9A. The arm, endpiece, lug and temple are shown by the dash lines in the position taken when the lens is in normal position as in Figure 1. In this position the arm 3 has been distended and the lug 9 is releasably secured in the lens notch 9A by the tension of the arm 3. Now turning to Figure 4 the lug 9 engages the lens notch 9A so that a jar or accidental blow against the endpiece or temple will cause the lug to slide rearwardly in the notch, the tension on the arcuate arm increasing as the lug slides rearwardly, since the rear of the notch is more distant from the screw attachment than the front of the notch.

The lenses are connected to the ears by means of a screw assembly as shown in Figure 3 or by any type of securing elements. The use of lock nuts will prevent the screws from loosening. The lenses pivot upon the screws and are secured in position by the projecting lugs engaging the lens notches. The lugs are positioned in the lens notches by flexing the arcuate arms and urged into tensional engagement by the spring action of the arcuate arms. The extension 3A of the arcuate arm 3 (Figure 5) provides an adjustable support preventing the arcuate arm from bending away from the top of the lens. The ear 5 is screwed against the rear surface of the lens and the extension 3A prevents any wobble since it can be adjusted to cause an urging, engaging spring tension against the rear surface of the lens.

The lug 9 is laterally releasably secured in the lens notch by friction. The friction can be increased by increasing the coil of the arcuate arms or by increasing the angle of the lugs inwardly. The friction between the lug and the lens notch is automatically increased when the lug is forced rearwardly.

It can now be seen that I have provided an ophthalmic mounting in accordance with the objects of my invention. Various modifications can be made such as; the ear can be positioned at the temporal side and the lug at the nasal side; the endpiece can be attached in various positions; the lug can be inclined upward or downward; the lug can be directed forwardly and angled by the fitter; the bridge can be attached to the arcuate arm at various points. These and other modifications can be made without departing from the spirit of my invention.

I claim:

1. In combination, in eyeglass construction, a pair of lenses, said lenses being provided with a hole at the nasal side and a notch at the temporal side, a bridge, arcuate arms extending from opposite sides of said bridge, ears, one of said ears being attached radially to each of said arcuate arms, means extending through the hole in the lenses and secured to said ears so that said lenses are pivotally attached to said ears and capable of vertical movement relative to its associated arm, lugs, one of said lugs extending from each of said arcuate arms and engaging said lens notch, said lugs being releasably secured in said lens notches by the spring action of said arcuate arms.

2. In combination, in eyeglass construction, a pair of lenses, said lenses being provided with a hole and a spaced notch, a bridge, a pair of resilient arcuate arms, each being connected to one side of said bridge and extending along one plane surface only and substantially following a portion of the periphery of said lens, ears, one of said ears being connected radially to each of said arcuate arms, said lenses being pivotally connected to said ears and capable of vertical movement relative to its associated arm, lugs, one of said lugs being connected to each of said arcuate arms so that said lug is substantially in alignment with said notch and being urged into tensional engagement with said notch for purposes set forth.

3. In an ophthalmic mounting, a bridge, a pair of lenses carried by said bridge, and a pair of arcuate spring arms connected to said bridge and extending laterally therefrom at the rear of and following the upper portion of the periphery of said lenses respectively, the outer ends of said arms having lugs projecting forwardly from the rear of the lenses with the free ends thereof terminating substantially flush with the forward faces of the lenses respectively and having their confronting faces converging forwardly from the arms to the free ends thereof, said lenses having notches at the outer side edges thereof respectively which open through the opopsite faces of the lenses and have their innermost wall portions beveled inwardly from the rear faces of the lenses to the forward faces thereof, and said lugs being disposed inwardly of said notches when the lugs are not engaged therein and being adapted to engage therein when the arms are sprung outwardly at their outer ends to thereby impinge the converging faces of the lugs against the beveled portions of the notches for resiliently retaining the lenses at their outer ends in clamping engagement with the lugs and the arms secured in position at the rear of the lenses.

4. In an ophthalmic mounting, a bridge having laterally extending projections, a pair of lenses, means for securing said lenses to said projections respectively so as to lie forwardly thereof and to permit of limited vertical swinging movement of the lenses relative to said bridge, and a pair of arcuate spring arms connected to said projections and extending laterally therefrom at the rear of and following the upper portion of the periphery of said lenses respectively, said lenses having notches extending inwardly at the outer side edges thereof respectively, and said arms having lugs projecting forwardly from the rear of the lenses and disposed inwardly of said notches when not engaged therein and said lugs being adapted to engage in said notches when the arms are sprung outwardly at their outer ends to thereby impinge the lugs against the inner wall portions of the notches for resiliently retaining the lenses in clamping engagement with the lugs and permitting of the release thereof for swinging of the lenses on their connections.

LOUIS JOHN PAGE.